United States Patent
Ha et al.

(10) Patent No.: US 10,404,393 B2
(45) Date of Patent: Sep. 3, 2019

(54) CLOCK SYNCHRONIZATION METHOD AND APPARATUS

(71) Applicant: ELECTRONICS AND TELECOMMUNICATIONS RESEARCH INSTITUTE, Daejeon-si (KR)

(72) Inventors: Young Mok Ha, Daejeon (KR); Eun Ji Pak, Daejeon (KR); Tae Ho Kim, Gunpo-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/353,764

(22) Filed: Nov. 17, 2016

(65) Prior Publication Data
US 2017/0141865 A1 May 18, 2017

(30) Foreign Application Priority Data
Nov. 18, 2015 (KR) .................. 10-2015-0162035

(51) Int. Cl.
*H04J 3/06* (2006.01)
*H04L 7/00* (2006.01)

(52) U.S. Cl.
CPC ................. *H04J 3/0667* (2013.01)

(58) Field of Classification Search
CPC .................................... H04J 3/0667
See application file for complete search history.

(56) References Cited

U.S. PATENT DOCUMENTS

2009/0276542 A1* 11/2009 Aweya ............. H04J 3/0667
709/248
2010/0223399 A1 9/2010 Kim et al.
2015/0163000 A1* 6/2015 Aweya ............. H04J 3/0602
370/519

FOREIGN PATENT DOCUMENTS

| CN | 105612704 A | 5/2016 |
|---|---|---|
| KR | 10-2011-0056087 A | 5/2011 |
| KR | 10-2011-0077329 A | 7/2011 |
| KR | 10-2012-0076135 A | 7/2012 |
| WO | 2015/049479 A1 | 4/2015 |

* cited by examiner

*Primary Examiner* — Yemane Mesfin
*Assistant Examiner* — Henry Baron
(74) *Attorney, Agent, or Firm* — LRK Patent Law Firm

(57) ABSTRACT

A clock synchronization apparatus and method, which perform clock synchronization by determining a clock offset and a network delay between a master and a slave in an IEEE 1588 system. The clock synchronization method and apparatus include observing a clock offset and a packet delay using a timing packet received from a master node; estimating a clock offset and a packet delay from the observed clock offset and the observed packet delay; and performing synchronization with the master node based on the clock offset and the packet delay.

10 Claims, 5 Drawing Sheets

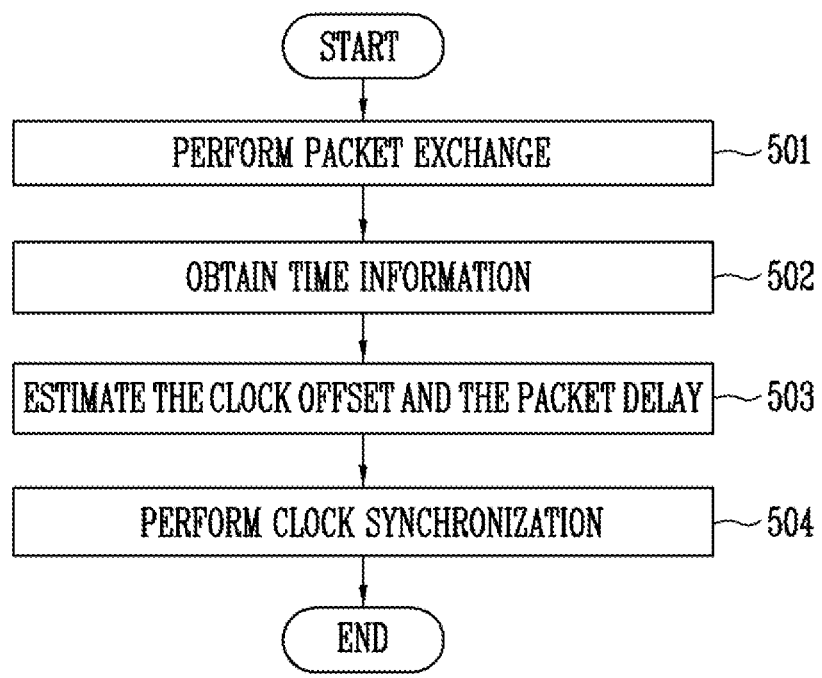

CLOCK SYNCHRONIZATION METHOD AND APPARATUS

CROSS-REFERENCE TO RELATED APPLICATION

The present application claims priority to Korean patent application number 10-2015-0162035, filed on Nov. 18, 2015, the entire disclosure of which is incorporated herein in its entirety by reference.

BACKGROUND

1. Field of Invention

Various embodiments of the present disclosure relate to a clock synchronization method and apparatus and, more particularly, to a method and apparatus for performing clock synchronization by determining a clock offset and a network delay between a master and a slave in an IEEE 1588 system.

2. Description of Related Art

In IEEE 1588 systems, as technology for synchronizing the clocks of nodes, an IEEE 1588 Precision Time Protocol (PTP) is used. The IEEE 1588 PTP estimates clock offset between nodes based on the packet delay estimation to synchronize clocks between nodes. For example, in a network with the IEEE 1588 PTP, all slave nodes synchronize their clocks with that of a master node by estimating clock offset between the slave node and the master node based on the packet delay estimation.

The clock offset estimation based on the packet delay estimation of the IEEE 1588 PTP is frequently used in various network systems owing to the simple structure and high performance thereof. However, in actual network systems, the IEEE 1588 PTP has a tendency to deteriorate the performance thereof due to various factors. As the factors deteriorating the performance of the IEEE 1588 PTP, there are various factors, such as an asymmetry of the packet delay, a clock skew, an algorithm for selecting the master node and a failure in synchronization with the master.

However, the most significant factor that deteriorates performance in the IEEE 1588 PTP is the inaccuracy of estimation of the packet delay due to the asymmetry of the packet delay. More specifically, in the IEEE 1588 PTP, the packet delay from the master to the slave and the packet delay from the slave to the master are assumed to be identical to each other. However, in an actual network environment, the two packet delays are not identical to each other due to various environmental variables, such as jitter. Therefore, such inaccurate estimation causes errors in estimating the clock offset between the master and the slave, and makes it impossible to completely synchronize the clocks of the master and the slave with each other.

SUMMARY

Various embodiments of the present disclosure are directed to a method and apparatus for accurately performing clock synchronization by determining both a clock offset and a network delay between nodes in real time using an Unscented Kalman Filter (UKF) and Integrated Nested Laplace Approximation (INLA) in a distributed system.

Various embodiments of the present disclosure are directed to provide a Dynamic Linear Model (DLM) for the clock offset estimation based on the packet delay estimation.

Further, various embodiments of the present disclosure are directed to a method and apparatus for accurately performing clock synchronization by using the provided DLM.

One embodiment of the present disclosure provides a clock synchronization method, including observing a clock offset and a packet delay using a timing packet received from a master node; estimating a clock offset and a packet delay from the observed clock offset and the observed packet delay; and performing synchronization with the master node based on the clock offset and the packet delay.

Another embodiment of the present disclosure provides a clock synchronization apparatus, including an input unit configured to receive a timing packet from a master node; and a controller configured to estimate a clock offset and a packet delay using the timing packet, and perform synchronization with the master node based on the clock offset and the packet delay, wherein the controller comprises a filter configured to estimate the clock offset and the packet delay from a clock offset and a packet delay that are observed using the timing packet.

Another embodiment of the present disclosure provides a clock synchronization method of a clock synchronization apparatus, comprising obtaining time information including packet transmission and packet receiving time of master node and slave node through packet exchange between the master node and the slave node; estimating a clock offset and a packet delay between the master node and the slave node; and performing clock synchronization between the master node and the slave node based on the estimated clock offset and the packet delay.

Another embodiment of the present disclosure provides a clock synchronization apparatus, comprising an input unit configured to perform packet exchange between a master node and a slave node; a controller configured to obtain time information including packet transmission and packet receiving time of the master node and the slave node through the packet exchange, estimate a clock offset and a packet delay between the master node and the slave node, and perform clock synchronization between the master node and the slave node based on the estimated clock offset and the packet delay.

BRIEF DESCRIPTION OF THE DRAWINGS

FIG. 5 is a flowchart showing in detail the operation of controller according to the present disclosure.

DETAILED DESCRIPTION

Repeated descriptions and descriptions of known functions and configurations which have been deemed to make the gist of the present disclosure unnecessarily obscure will be omitted below.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

A singular expression includes a plural expression unless a description to the contrary is specifically pointed out in context.

Hereinafter, the present disclosure will be described in detail with reference to the attached drawings.

Figure 1:
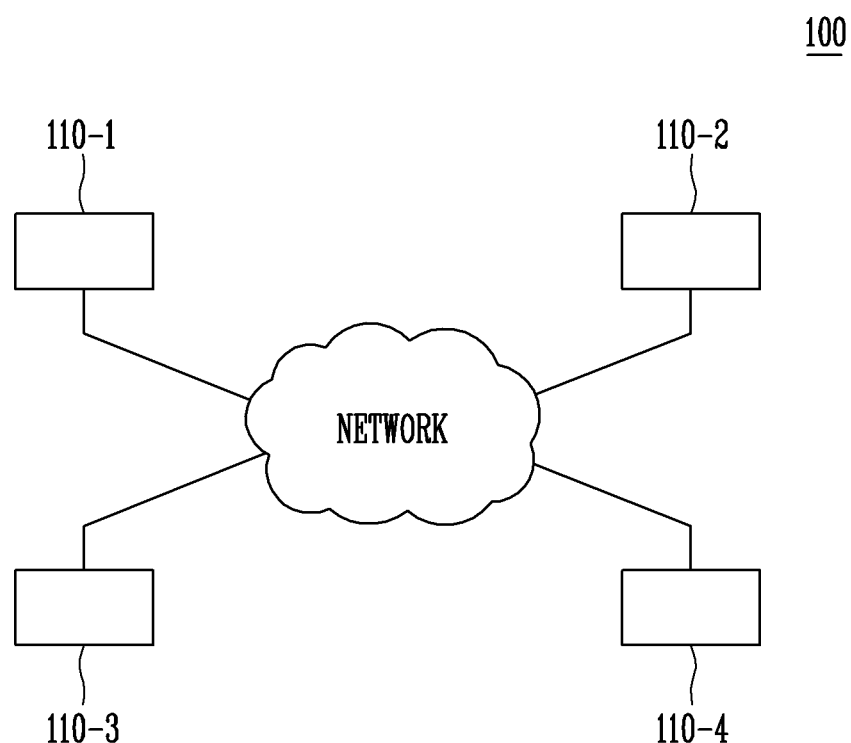
FIG. 1 is a diagram showing the configuration of a distributed system to which the present disclosure is applicable.

FIG. 1 is a diagram showing the configuration of a distributed system to which the present disclosure is applicable.

A distributed system 100 according to the present disclosure is an IEEE 1588 PTP based system, and multiple nodes 110-1, 110-2, 110-3, and 110-4 constituting the distributed system 100 synchronize their times with each other using a time (clock) synchronization apparatus according to the present disclosure.

Some node of the multiple nodes 110-1, 110-2, 110-3, and 110-4 constituting the distributed system 100 functions as a master node 110-1 capable of transmitting information for clock synchronization to all nodes of the distributed system 100.

Further, some other node of the multiple nodes 110-1, 110-2, 110-3, and 110-4 constituting the distributed system 100 functions as a slave node 110-2 for synchronizing its time with the time of the master node 110-1 using clock synchronization information transmitted from the master node 110-1.

The master node 110-1 uses time information received from a Global Positioning System (GPS) or an exact clock source as basic time (clock) for IEEE 1588 PTP.

The slave node 110-2 synchronizes its internal time (local clock) with the time of the master node 110-1 using the time information received from the master node 110-1.

In the distributed system 100 according to the present disclosure, the master node 110-1 and the slave node 110-2 perform the clock synchronization according to the present disclosure.

The master node 110-1 and the slave node 110-2 according to the present disclosure may estimate, from an observed clock offset, both a clock offset and a packet delay in which an actual network environment is reflected, by using a Dynamic Linear Model (DLM), an Unscented Kalman Filter (UKF) and an Integrated Nested Laplace Approximation (INLA).

Below, a clock synchronization apparatus provided in each of multiple nodes 110-1, 110-2, 110-3, and 110-4 to perform the clock synchronization is described in detail.

Hereinafter, a time of the master node 110-1 is denoted by T, and a time of the slave node 110-2 is denoted by C[T]. The clock offset $\delta$ is the difference between T and C[T]. An initial clock offset is denoted by $\delta_0$ where the lower index is used to express the number of clock synchronization recursion.

Figure 2:
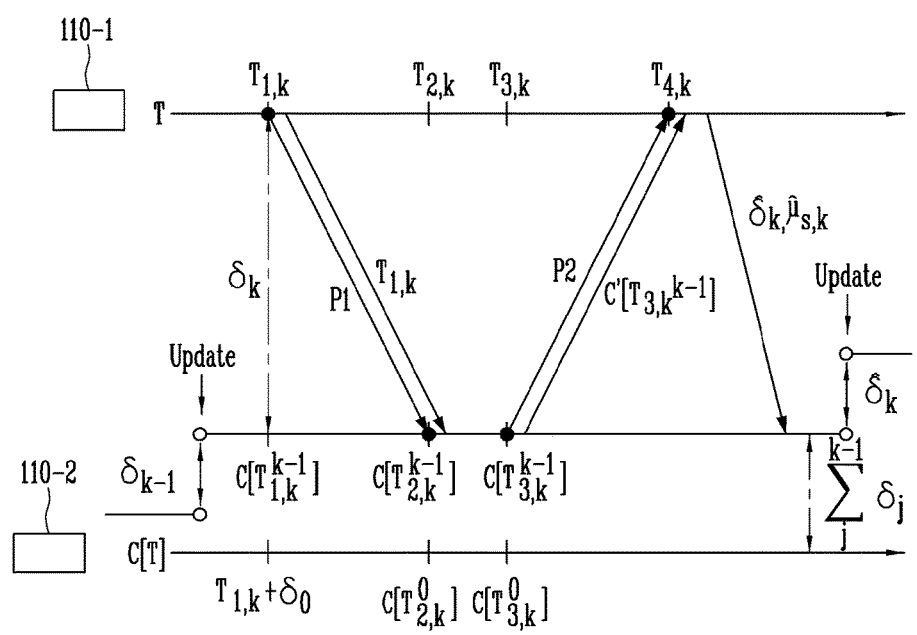
FIG. 2 is a flowchart showing a method for clock synchronization between nodes according to the present disclosure.

In the clock synchronization, the packet exchange in FIG. 2 is used for the estimation.

Referring to FIG. 2, in the k-th clock synchronization recursion, the master node 110-1 transmits a packet (sync packet) P1 to the slave node 110-2 at $T_{1,k}$. The $\delta_k$ is defined by $C[T_{1,k}^{\kappa-1}]-T_{1,k}$, where the upper index is used to express applications of previous clock synchronizations to the slave node 110-2; $C[T_{i,k}^{\kappa}]=C[T_{i,k}^{0}]-\Sigma_{j=1}^{\kappa}\hat{\delta}_j$, $i \in \{1, 2, 3, 4\}, \kappa \in N$, where N is a set of natural numbers, and $\hat{\delta}_j$ is estimated clock offset by j-th clock synchronization.

Further, the master node 110-1 measures $T_{1,k}$ at which packet P1 is transmitted, and transmits the measured $T_{1,k}$ information to the slave node 110-2.

The slave node 110-2 measures $C[T_{2,k}^{\kappa-1}]$ at which packet P1 is received.

The slave node 110-2 transmits packet (delay-request packet) P2 to the master node 110-1. Further, the slave node 110-2 measures $C[T_{3,k}^{\kappa-1}]$ at which packet P2 is transmitted, and transmits the measured time $C[T_{3,k}^{\kappa-1}]$ to the master node 110-1.

The master node 110-1 measures $T_{4,k}$ at which packet P2 is received.

The master node 110-1 and the slave node 110-2 share the measured information and calculate the estimated clock offset $\hat{\delta}_k$ according to the present disclosure.

The slave node 110-2 updates the clock of the slave node 110-2 by $\hat{\delta}_k$.

The estimated clock offset $\hat{\delta}_k$ is calculated by a clock synchronization apparatus according to the present disclosure.

Figure 3:
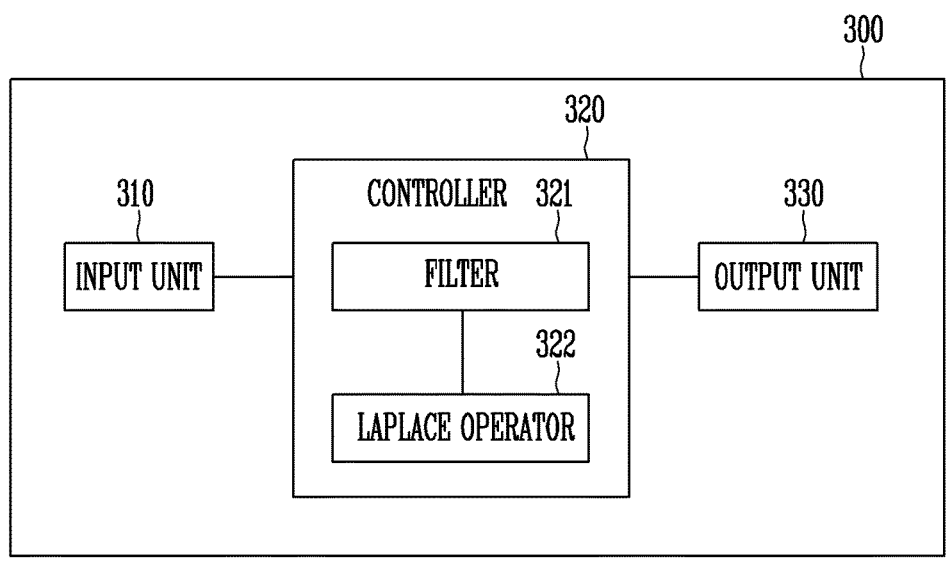
FIG. 3 is a block diagram showing the structure of a clock synchronization apparatus according to the present disclosure.

FIG. 3 is a block diagram showing the structure of a clock synchronization apparatus according to the present disclosure. A clock synchronization apparatus 300 shown in FIG. 3 is a device included in the master node 110-1 or the slave node 110-2 and may be a device for performing operation required for clock synchronization.

Referring to FIG. 3, the clock synchronization apparatus 300 according to the present disclosure may include an input unit 310, a controller 320, and an output unit 330.

The input unit 310 collects pieces of information about time $T_1$ at which the master node 110-1 transmits packet P1, time $T_2$ at which the slave node 110-2 receives packet P1, time $T_3$ at which the slave node 110-2 transmits packet P2 to the master node 110-1, and time $T_4$ at which the master node 110-1 receives packet P2.

The controller 320 estimates a clock offset and a packet delay ($\delta_i$ and $\phi_j$ where i,j is non-negative integer) between the master node 110-1 and the slave node 110-2 using the system information collected through the input unit 310. Further, the controller 320 performs clock synchronization between the master node 110-1 and the slave node 110-2 by estimating the clock offset of the slave node 110-2 based on the estimated clock offset and packet delay. The controller 320 may output the estimated clock offset and the packet delay for the clock synchronization.

In various embodiments of the present disclosure, the controller 320 observes the clock offset using the collected time information, and estimates a clock offset and a packet delay in which an actual system environment is reflected, using a Dynamic Linear Model (DLM), and an Unscented Kalman Filter (UKF) based on the DLM and Integrated Nested Laplace Approximation (INLA) from the observed clock offset. For this operation, the controller 320 may include a filter 321 for performing a UKF operation and a Laplace operator 322 for performing INLA.

The detailed structure of the DLM, operations of the filter 321 and the Laplace operator 322 will be described later.

The controller 320 may directly perform clock synchronization with the master node 110-1 by estimating the clock offset of the slave node 110-2 based on the estimated clock offset and packet delay, or may perform clock synchronization using other components constituting the slave node 110-2 by outputting the estimated clock offset and packet delay through the output unit 330.

The output unit 330 may output the clock offset and the packet delay estimated by the controller 320 to the outside of the clock synchronization apparatus.

Below, the detailed operations of the filter 321 and the Laplace operator 322 will be described.

Figure 4:
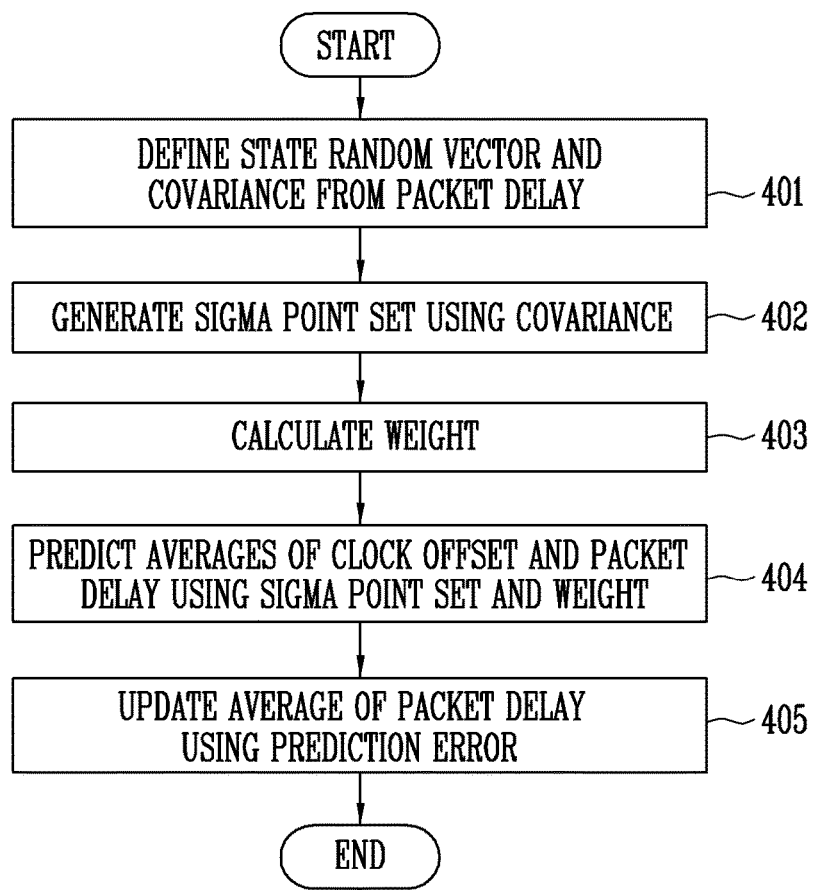
FIG. 4 is a flowchart showing in detail the operation of a filter according to the present disclosure.

FIG. 4 is a flowchart showing in detail the operation of the filter according to the present disclosure.

The filter 321 estimates a packet delay and a clock offset using a UKF. The UKF is a filter that enables accurate estimation even if a target to be estimated exhibits strong nonlinearity. For nonlinear filtering, the UKF uses symmetric sampling, Gaussian Markov chain approximation, and a Kalman filter framework.

All procedures in the UKF according to the present disclosure are performed, with a fixed number of parameters being intuited. The filter 321 is designed in consideration of parameters that may influence the estimation of a packet delay and a clock offset. That is, the filter outputs an estimated clock offset which is estimated to be a clock offset in an actual environment, based on the observed clock offset and parameters that are input, and a DLM over time.

For a certain input vector u, when a clock offset $z_{k+1}$ and a packet delay $x_{k+1}$ observed at (k+1)-th time (current) synchronization are represented by the following Equation (1), the filter 321 estimates $\{\hat{z}_{k+1}, \hat{x}_{k+1}\}$ using a UKF.

$$z_{k+1}=h[x_{k+1}]+w_{k+1}, w_{k+1} \sim N(0, Q_{k+1}) \tag{1-1}$$

$$x_{k+1}=g[x_k, u_{k+1}, v_{k+1}], v_{k+1} \sim N(0, R_{k+1}) \tag{1-2}$$

Here, $x_k$ denotes a previously estimated packet delay, that is, a packet delay estimated in k-th synchronization. The filter 321 estimates a current clock offset and a current packet delay using both the previously estimated packet delay and the currently observed clock offset.

In the distributed system 100 according to the present disclosure, functions h and g may be linear functions or may also be nonlinear functions due to jitter resulting from synchronization or communication distribution scheduling, frequency distortion, processing speed, interrupt/system call processing, and etc.

Referring to FIG. 4, the filter 321 defines an n-dimensional state random vector $x_k^\alpha$ and a covariance $P_k^\alpha$ from the packet delay $x_k$ (401). Here, the state random vector $x_k^\alpha$ may be defined by the following Equation (2), and the covariance $P_k^\alpha$ may be represented by the following Equation (3):

$$x_k^a = [x_k^T v_k^T]^T \tag{2}$$

$$P_k^a = \begin{bmatrix} P_k^{xx} & P_k^{xy} \\ P_k^{yx} & P_k^{yy} \end{bmatrix} \tag{3}$$

Next, the filter 321 generates a sigma point set using the covariance $P_k^\alpha$ (402). In this regard, the filter 321 may generate (2N+1) symmetric points $X_j$ using an N×N matrix, as given by the following Equation (4), where N denotes the number of state random vectors $x_k^\alpha$.

$$[X_k^\alpha]_0^x = \hat{x}_k, [X_k^\alpha]_j^x = \hat{x}_k^\alpha + \sigma_j X_k^\alpha]_{j+N}^x = \hat{x}_k^\alpha - \sigma_j \tag{4}$$

where $\sigma_j = \gamma [\sqrt{P_k^\alpha}]_j$, $\gamma = \sqrt{\lambda + N}$, $\lambda = \alpha^2(\kappa + N) - N$, $[\sqrt{P_k^\alpha}]_j$ is the j-th column (j={1, 2, ..., N}) of the matrix $\sqrt{P_k^\alpha}$.

Then, the filter 321 calculates a weight W (403). The weight W may be calculated using the following Equation (5):

$$W_0^x = \lambda/(\lambda+N) \tag{5-1}$$

$$W_0^P = \lambda/(\lambda+N) + (1-\alpha^2+\beta) \tag{5-2}$$

$$W_i^x = W_i^P = 1/2(\lambda+N) \tag{5-3}$$

where $l=\{1, 2, ..., 2N\}$, $\lambda = \alpha^2(\kappa+N) - N$, and $\{\alpha, \beta, \kappa\}$ are scale variables.

Thereafter, the filter 321 predicts $\hat{z}_{k+1}$ and $\hat{x}_{k+1}$ using the generated sigma point set and the calculated weight W (404). The filter 321 predicts $\hat{z}_{k+1}$ and $\hat{x}_{k+1}$ using the sigma point set and the weighted sigma point set to which the weight W is added, as given by the following Equation (6):

$$\hat{z}_{k+1|k} = \Sigma_{i=0}^{2N} W_i^x [Z_{k+1|k}]_i \tag{6-1}$$

$$\hat{x}_{k+1|k} = \Sigma_{i=0}^{2N} W_i^x [X_{k+1|k}]_i \tag{6-2}$$

$$P_{k+1|k}^{zz} = \Sigma_{i=0}^{2N} W_i^P [[Z_{k+1|k}]_i - \hat{z}_{k+1|k}][[Z_{k+1|k}]_i - \hat{z}_{k+1|k}]^T + Q_{k+1} \tag{6-3}$$

$$P_{k+1|k}^{xx} = \Sigma_{i=0}^{2N} W_i^P [[X_{k+1|k}]_i - \hat{x}_{k+1|k}][[X_{k+1|k}]_i - \hat{x}_{k+1|k}]^T \tag{6-4}$$

where $Z_{k+1|k} = H[\{[X_k^\alpha]_j^z\}]$, $X_{k+1|k} = G[\{[X_k^\alpha]_j^z\}, u(k+1)]$, and $\{[X_k^\alpha]^z\}$ denotes 2N+1 symmetric points based on $\hat{x}_{k+1|k}$ and $P_{k+1|k}^{xx}$.

Next, the filter 321 updates the predicted $\hat{x}_{k+1}$ using a prediction error (405). The filter 321 determines a prediction error $\varepsilon_{k+1} = (z_{k+1} - \hat{z}_{k+1})$ from the difference between the predicted $\hat{z}_{k+1}$ and the observed clock offset $z_{k+1}$, and calculates a cross correlation matrix $\hat{P}_{k+1|k}^{xz}$ using the following Equation (7):

$$P_{k+1|k}^{xz} = \Sigma_{i=0}^{2N} W_i^P [[X_{k+1|k}]_i - \hat{x}_{k+1|k}][[Z_{k+1|k}]_i - \hat{z}_{k+1|k}]^T \tag{7}$$

The filter 321 updates the predicted $\hat{x}_{k+1}$ using the calculated cross correlation matrix, as given by the following Equations (8) and (9):

$$\hat{x}_{k+1|k+1} = \hat{x}_{k+1|k} + K_{k+1} \varepsilon_{k+1} \tag{8}$$

$$P_{k+1|k+1}^{xx} = P_{k+1|k}^{xx} - K_{k+1} P_{k+1|k}^{zz} K_{k+1}^T \tag{9}$$

where $K_{k+1} = P_{k+1|k}^{xx} \cdot (P_{k+1|k}^{zz})^{-1}$.

The Laplace operator 322 regards the clock offset estimated by the filter 321 as a latent Gaussian model, and derives a hyperparameter $\theta_{k+1} = \{Q_{k+1}, R_{k+1}\}$ for the estimated clock offset $z_{k+1}$. For this operation, the Laplace operator 322 uses Integrated Nested Laplace Approximation (INLA), as in the following Equation (10):

$$\tilde{\pi}(x|z) = \int \tilde{\pi}(x|\theta, z) \tilde{\pi}(\theta|z) d\theta \tag{10-1}$$

$$\tilde{\pi}(\theta|z) \propto \frac{\pi(x, \theta, z)}{\tilde{\pi}(x|\theta, z)}\bigg|_{x=F^*(\theta)} \tag{10-2}$$

where $\tilde{\pi}(\theta|z)$ denotes an approximate expression of $\pi(\theta|z)$, F denotes functional approximation, and F* denotes the value of mode.

Considering that Equation (1) represents a first order Markov chain, the posterior marginal distribution $\pi(\theta_{k+1}|z_{1:k+1})$ of the hyperparameter $\theta_{k+1}$ is approximated, as represented by the following Equation (11):

$$\pi(\theta_{k+1}|Z_{1:k+1}) \approx \tilde{\pi}(\theta_{k+1}|z_{1:k+1}) \propto \tag{11}$$

-continued $$\left.\frac{\pi(x_{k+1}, \theta_{k+1}, z_{k+1})}{\tilde{\pi}_F(x_{k+1} \mid \theta_{k+1}, z_{k+1})}\right|_{x_{k+1}=F^*(\theta)}$$

Equation (11) may be sequentially approximated, as given in the following Equation (12):

$$\pi(\theta_{k+1} \mid z_{1:k+1}) \approx \tilde{\pi}(\theta \mid z_{1:k+1}) \propto \left.\frac{\tilde{\pi}(x_{k+1}, \theta, z_{k+1})}{\tilde{\pi}_F(x_{k+1} \mid \theta, z_{k+1})}\right|_{x_{k+1}} = \quad (12)$$

$$F^*(\theta) \propto \left.\frac{\tilde{\pi}(z_{k+1} \mid x_{k+1}, \theta, z_{k+1})\tilde{\pi}(x_{k+1} \mid \theta, z_{k+1})}{\tilde{\pi}_F(x_{k+1} \mid \theta, z_{k+1})}\right|_{x_{k+1}=F^*(\theta)}$$

In order to perform calculation, $\tilde{\pi}_G(x_{k+1}|\theta, z_{1:k+1})$ in Equation (12) may be replaced with the following Equation (13):

$$\tilde{\pi}_F(x_{k+1}|\theta, z_{k+1}) = \tilde{\pi}_G(x_{k+1}|\theta, z_{k+1}) \propto \exp(-1/2(x_{k+1}-\hat{\mu})^T\hat{\Sigma}^{-1}(x_{k+1}-\hat{\mu})) \quad (13)$$

When $\hat{\Sigma}^{-1}$ and $\hat{\mu}$ are calculated using a Newton-Raphson method, Equation (13) may be represented by the following Equation (14):

$$\pi(x_{k+1}|\theta, z_{1:k+1}) \propto \exp(-1/2 x_{k+1}^T \Sigma^{-1} x_{k+1} + \Sigma_i^{k+1} \log \pi(z_i|x_{+1})) \quad (14)$$

In Equation (14), for computational efficiency, the initial condition is set to $\mu_{(0)} = \text{argmax}_{x_{k+1}} \tilde{\pi}_{UKF}(x_{k+1}|\theta, z_{1:k+1})$.

In various embodiments, the operation of the Laplace operator 322 may be performed to derive the hyperparameter while the filter 321 estimates the clock offset and the packet delay using the UKF. Accordingly, the Laplace operator 322 may be provided in the filter 321 or may constitute the filter 321 itself.

In other embodiments, the derivation of the hyperparameter using INLA may be performed in advance before the clock offset and the packet delay are estimated using a UKF. Alternatively, the derivation of the hyperparameter using INLA may also be performed after the clock offset and the packet delay are estimated using a UKF, in order to estimate the clock offset in a subsequent period. In relation to this operation, the present disclosure is not limited to specific cases.

Hereinafter, in accordance with another embodiment of the invention, a method for the clock synchronization, DLM is described.

FIG. 5 is a flowchart showing in detail the operation of controller according to the present disclosure.

According to the FIG. 5, the controller 320 performs the packet exchange with other clock synchronization apparatus (501). In detail, when the clock synchronization apparatus 300 of the controller 320 operates as the master node 110-1, the controller 320 transmits P1 and receives P2 as described in FIG. 2. When the clock synchronization apparatus 300 of the controller 320 operates as the slave node 110-2, the controller 320 receives P1 and transmits P2.

The controller 320 obtains time information including $T_{1,k}$, $C[T_{2,k}^{\kappa-1}]$, $C[T_{3,k}^{\kappa-1}]$ and $T_{4,k}$ (502).

After that, the controller 320 estimates the clock offset and the packet delay (503).

In detail, the controller 320 defines a relation between the packet delays, $\phi_{s,k}$ and $\phi_{d,k}$ where $\phi_{s,k}$ and $\phi_{d,k}$ are packet delays of the k-th P1 and P2, respectively. After, the controller 320 derives a DLM for the PDV so the estimated clock offset and the packet delay reflects the actual system environment. And the controller 320 estimates the clock offset and the packet delay using the derived DLM.

In detail, the controller 320 defines the relation between the packet delays $\phi_{s,k}$ and $\phi_{d,k}$ by the following Equation (15):

$$\phi_{d,k} = \phi_{s,k} + \psi_k \quad (15)$$

From Equation (16), $\psi_k$ represents a packet delay variation (PDV) between the P1 and the P2 in FIG. 2.

An error in the estimation of the packet delay may be represented as $\varepsilon_{\phi,k}$. Also, an error in the estimation of the clock offset may be represented as $\varepsilon_{\delta,k}$.

After, the controller 320 derives the DLM for the PDV between the P1 and the P2. The derived DLM describes variations of the PDV over time. This description enables a dynamic trace of the packet delays and their variations. For this, the controller 320 explores DLMs of the packet delays $\phi_{s,k}$ and $\phi_{d,k}$. Then, the controller 320 derives the DLM for the PDV.

The derivation begins from an analysis of a packet exchange. Suppose repeated packet exchanges between the master node 110-1 and the slave node 110-2. The PDV of the P1 and the P2 are expressed by a numerical differential of the packet delay. For example, the numerical differential $\Delta\phi_{s,k}(=\phi_{s,k}-\phi_{s,k-1})$ denotes the k-th PDV of the P1. In addition, the packet delays are expressed by time information of the clock of the master node 110-1. For example, a difference between $T_{1,k}$ and $T_{2,k}$ ($T_{1,k}-T_{2,k}$) denotes the packet delay of the k-th P1, $\phi_{s,k}$. The differentials of the information express their variation. A difference between $\Delta T_{1,k}$ and $\Delta T_{2,k}$ denotes the k-th PDV of the P1, $\Delta\phi_{s,k}$ where $\Delta T_{1,k} = T_{1,k} - T_{1,k-1}$, $\Delta T_{2,k} = T_{2,k} - T_{2,k-1}$. Similarly, a difference between $\Delta T_{3,k}$ and $\Delta T_{4,k}$ denotes the k-th PDV of the P2, $\Delta\phi_{d,k}$, where $\Delta T_{3,k} = T_{3,k} - T_{3,k-1}$, $\Delta T_{4,k} = T_{4,k} - T_{4,k-1}$. The numerical differentials of the packet delays provide the DLMs of the packet delays as following Equations (16) and (17):

$$\phi_{s,k} = \phi_{s,k-1} + \Delta T_{2,k} - \Delta T_{1,k} \quad (16)$$

$$\phi_{d,k} = \phi_{d,k-1} + \Delta T_{4,k} - \Delta T_{3,k} \quad (17)$$

According to the FIG. 2, the $T_{2,k}$ and $T_{3,k}$, are not given to both of the master node 110-1 and the slave node 110-2. The controller 230 receives $T_{1,k}$, $C[T_{2,k}^{\kappa-1}]$, $C[T_{3,k}^{\kappa-1}]$, and $T_{4,k}$ through the input unit 310. Here, the given $C[T_{2,k}^{\kappa-1}]$ and $C[T_{3,k}^{\kappa-1}]$ may be represented by the following Equations (18) and (19):

$$C[T_{2,k}^{\kappa-1}] = (T_{1,k} + \delta_k) + \frac{f_{c,k}}{f_0}\phi_{s,k} \quad (18)$$

$$C[T_{3,k}^{\kappa-1}] = (T_{1,k} + \delta_k) + \frac{f_{c,k}}{f_0}\{(T_{4,k} - T_{1,k}) - \phi_{d,k}\} \quad (19)$$

From Equations (18) and (19), $f_0$ and $f_c$ represent frequencies of the clock of the master node 110-1 and the clock of the slave node 110-2, respectively. Using the above time information of the slave node 110-2, the DLMs may be re-expressed by the following Equations (20) and (21):

$$\phi_{s,k} = \phi_{s,k-1} + \frac{f_0}{f_{c,k}}C[T_{2,k}^{\kappa-1}] - \Delta T_{1,k} \quad (20)$$

$$\phi_{d,k} = \phi_{d,k-1} + \Delta T_{4,k} - \frac{f_0}{f_{c,k}}C[T_{3,k}^{\kappa-1}] \quad (21)$$

From Equations (21) and (22), $\Delta C[T_{i,k}^{\kappa-1}] = C[T_{i,k}^{\kappa-1}] - C[T_{i,k-1}^{\kappa-1}]$, $i \in \{2,3\}$. Note that the $C[T_{i,k}^{\kappa-1}]$ and $C[T_{i,k-1}^{\kappa-1}]$ are on the same axis. For given the Equations (18) to (21), the DLM may be derived as the following Equation (22):

$$\psi_k = \psi_{k-1} + [1\ 1]\Gamma_k + \frac{f_0}{f_{c,k}}[-1\ -1]\Xi_k \quad (22)$$

$$\Gamma_k = [\Delta T_{1,k} \Delta T_{4,k}]^T$$

$$\Xi_k = [\Delta C[T_{2,k}^{\kappa-1}] \Delta C[T_{3,k}^{\kappa-1}]]^T$$

When the Equations (18) and (19) are arranged as an equation in terms of $\Psi_k$, and the Equations (20) and (21) are substituted into, the DML is derived by the Equation (23).

Lastly, the controller 230 estimates the clock offset $\hat{\delta}_k^{new}$ and the packet delay $\hat{\phi}_{s,k}^{new}$. Based on the above equations, the errors may be expressed by the Equations (23) and (24):

$$\varepsilon_{\delta,k} = \frac{1}{2f_0}\{(f_{c,k} - f_0)(T_{4,k} - T_{1,k}) - f_{c,k}\psi_k\} \quad (23)$$

$$\varepsilon_{\phi,k} = \frac{1}{2f_0}\{f_{c,k}\psi_k - (f_{c,k} - f_0)(T_{4,k} - T_{1,k})\} \quad (24)$$

The estimated clock offset and the estimated packet delay which considers the errors according to the present invention are represented by the Equations (25) and (26), respectively:

$$\hat{\delta}_k^{new} = \hat{\delta}_k^{1588} - \varepsilon_{\delta,k} + n_k \quad (25)$$

$$\hat{\phi}_{s,k}^{new} = \frac{f_0}{f_{c,k}}(\hat{\phi}_{s,k}^{1588} - \varepsilon_{\phi,k} + n_k) \quad (26)$$

where $$\hat{\delta}_k^{1588} = (C[T_{2,k}^{\kappa-1}] - T_{1,k}) - \hat{\phi}_{s,k}^{1588}$$

$$\hat{\phi}_{s,k}^{1588} = \frac{1}{2}\{(T_{4,k} - C[T_{3,k}^{\kappa-1}]) + (C[T_{2,k}^{\kappa-1}] - T_{1,k})\}.$$

From Equations (25) and (26), the last term on the right-hand side express noise of the clock of the slave node 110-2. Note that $n_k$ refers to relative noise with respect to the clock of the slave node 110-2.

In various embodiments of the present invention, the controller 320 estimates the clock offset and the packet delay according to the above described process, and performs the clock synchronization with the other clock synchronization apparatus on the other side node or transmits the estimated clock offset and the estimated packet delay to the other clock synchronization apparatus of the other side node so that the other clock synchronization apparatus can perform the clock synchronization with the clock synchronization apparatus 300 (504) by modifying the clock of the other clock synchronization apparatus.

The clock synchronization method and apparatus according to the present disclosure enable accurate clock synchronization to be realized between nodes in real time using the IEEE 1588 PTP in a distributed system composed of partitioned real-time systems.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A clock synchronization method of a clock synchronization apparatus, comprising:
    obtaining time information including packet transmission and packet receiving time of master node and slave node through packet exchange between the master node and the slave node;
    estimating a clock offset and a packet delay between the master node and the slave node; and
    performing clock synchronization between the master node and the slave node based on the estimated clock offset and the packet delay, wherein the time information includes a first packet transmission time of the master node $T_{1,k}$, a first packet receiving time of the slave node $C[T_{2,k}^{\kappa-1}]$, a second packet transmission time of the slave node $C[T_{3,k}^{\kappa-1}]$ and a second packet receiving time of the master node $T_{4,k}$, wherein (k={1, 2, ..., N}) and (κ={0, 1, 2 ..., N−1}) N being a natural number, and
    wherein estimating the clock offset and the packet delay comprises:
    defining a relation between a packet delay of a first packet $\phi_{s,k}$ and a packet delay of a second packet $\phi_{d,k}$ based on a Packet Delay Variation (PDV) between the first packet and the second packet $\psi_k$;
    deriving a Dynamic Linear Model (DLM) for the PDV; and
    estimating the clock offset and the packet delay based on the derived DLM.

2. The clock synchronization method according to claim 1, wherein the relation between the packet delay of the first packet $\phi_{s,k}$ and the packet delay of the second packet $\phi_{d,k}$ is defined by the following Equation (1):

$$\phi_{d,k} = \phi_{s,k} + \psi_k \quad (1).$$

3. The clock synchronization method according to claim 2, wherein deriving the DLM for the PDV comprises:
    defining the packet delay of the first packet $\phi_{s,k}$ and the packet delay of the second packet $\phi_{d,k}$ by the following Equations (2) and (3), respectively, where $T_{2,k}$ is a first packet receiving time of the master node, $T_{3,k}$ is a second packet transmission time of the master node, a difference between $\Delta T_{1,k}$ and $\Delta T_{2,k}$ denotes a k-th PDV of the first packet in a k-th clock synchronization and a difference between $\Delta T_{3,k}$ and $\Delta T_{4,k}$ denotes a k-th PDV of the second packet in the k-th clock synchronization;

$$\phi_{s,k} = \phi_{s,k-1} + \Delta T_{2,k} - \Delta T_{1,k} \quad (2)$$

$$\phi_{d,k} = \phi_{d,k-1} + \Delta T_{4,k} - \Delta T_{3,k} \quad (3)$$

defining the first packet receiving time of the slave node $C[T_{2,k}^{\kappa-1}]$ and the second packet transmission time of the slave node $C[T_{3,k}^{\kappa-1}]$ by the following Equations (4) and (5), respectively, where $\delta_k$ is a k-th clock offset in the k-th clock synchronization, $f_0$ and $f_c$ represent frequencies of a clock of the master node and the clock of the slave node respectively; and $$C[T_{2,k}^{\kappa-1}] = (T_{1,k} + \delta_k) + \frac{f_{c,k}}{f_0}\phi_{s,k} \quad (4)$$

$$C[T_{3,k}^{\kappa-1}] = (T_{1,k} + \delta_k) + \frac{f_{c,k}}{f_0}\{(T_{4,k} - T_{1,k}) - \phi_{d,k}\} \quad (5)$$

deriving the DLM for the PDV by the following Equation (6), where $$\Delta T_{i,k} = T_{i,k} - T_{i,k-1}, i \in \{1, 4\}, \Delta C[T_{j,k}^{\kappa-1}] = \quad (6)$$

$$C[T_{j,k}^{\kappa-1}] - C[T_{j,k-1}^{\kappa-1}], j \in \{2, 3\},$$

$$\Gamma_k = [\Delta T_{1,k} \Delta T_{4,k}]^T, \Xi_k =$$

$$[\Delta C[T_{2,k}^{\kappa-1}] \Delta C[T_{3,k}^{\kappa-1}]]^T \cdot \psi_k = \psi_{k-1} + [1\,1]\Gamma_k + \frac{f_0}{f_{c,k}}[-1\,-1]\Xi_k.$$

4. The clock synchronization method according to claim 3, wherein estimating the clock offset and the packet delay comprises:
defining errors of the estimation of the packet delay of the first packet and the packet delay of the second packet by the following Equations (7) and (8);

$$\varepsilon_{\delta,k} = \frac{1}{2f_0}\{(f_{c,k} - f_0)(T_{4,k} - T_{1,k}) - f_{c,k}\psi_k\} \quad (7)$$

$$\varepsilon_{\phi,k} = \frac{1}{2f_0}\{f_{c,k}\psi_k - (f_{c,k} - f_0)(T_{4,k} - T_{1,k})\} \quad (8)$$

modeling the clock offset $\hat{\delta}_k^{new}$ and the packet delay $\hat{\phi}_{s,k}^{new}$ considering the errors by the following Equations (9) and (10), respectively, $n_k$ refers to relative noise with respect to the clock of the slave node; and $$\hat{\delta}_k^{new} = \hat{\delta}_k^{1588} - \varepsilon_{\delta,k} + n_k \quad (9)$$

$$\hat{\phi}_{s,k}^{new} = \frac{f_0}{f_{c,k}}(\hat{\phi}_{s,k}^{1588} - \varepsilon_{\phi,k} + n_k), \quad (10)$$

where $$\hat{\delta}_k^{1588} = (C[T_{2,k}^{k-1}] - T_{1,k}) - \hat{\phi}_{s,k}^{1588} \text{ and } \hat{\phi}_{s,k}^{1588} =$$

$$\frac{1}{2}\{(T_{4,k} - C[T_{3,k}^{\kappa-1}]) + (C[T_{2,k}^{\kappa-1}] - T_{1,k})\},$$

estimating the clock offset and the packet delay by inputting the time information to the modeled clock offset $\hat{\delta}_k^{new}$ and the packet delay $\hat{\phi}_{s,k}^{new}$.

5. The clock synchronization method according to claim 1, wherein performing the clock synchronization comprises:
transmitting the estimated clock offset and the packet delay to the slave node so that the slave node modifies the clock of the slave node based on the estimated clock offset and the packet delay.

6. A clock synchronization apparatus, comprising:
an input unit configured to perform packet exchange between a master node and a slave node;
a controller configured to obtain time information including packet transmission and packet receiving time of the master node and the slave node through the packet exchange, estimate a clock offset and a packet delay between the master node and the slave node, and perform clock synchronization between the master node and the slave node based on the estimated clock offset and the packet delay, wherein the time information includes a first packet transmission time of the master node $T_{1,k}$, a first packet receiving time of the slave node $C[T_{2,k}^{K-1}]$, a second packet transmission time of the slave node $C[T_{3,k}^{K-1}]$ and a second packet receiving time of the master node $T_{4,k}$, wherein (k={1, 2 . . . N}) and (x={0, 1, 2 . . . N−1}) N being a natural number, and
wherein the controller defines a relation between a packet delay of a first packet $\phi_{s,k}$ and a packet delay of a second packet $\phi_{d,k}$ based on a Packet Delay Variation (PDV) $\psi_k$, derives a Dynamic Linear Model (DLM) for the PDV and estimates the clock offset and the packet delay based on the derived DLM.

7. The clock synchronization apparatus according to claim 6, wherein the controller defines the relation between the packet delay of the first packet $\phi_{2,k}$ and the packet delay of the second packet $\phi_{d,k}$ is defined by the following Equation (11):

$$\phi_{d,k} = \phi_{s,k} + \psi_k \quad (11).$$

8. The clock synchronization apparatus according to claim 7, wherein the controller defines the packet delay of the first packet $\phi_{s,k}$ and the packet delay of the second packet $\phi_{d,k}$ by the following Equations (12) and (13), respectively, where $T_{2,k}$ is a first packet receiving time of the master node, $T_{3,k}$ is a second packet transmission time of the master node, a difference between $\Delta T_{1,k}$ and $\Delta T_{2,k}$ denotes a k-th PDV of the first packet in a k-th clock synchronization and a difference between $\Delta T_{3,k}$ and $\Delta T_{4,k}$ denotes a k-th PDV of the second packet in the k-th clock synchronization;

$$\phi_{s,k} = \phi_{s,k-1} + \Delta T_{2,k} - \Delta T_{1,k} \quad (12)$$

$$\phi_{d,k} = \phi_{d,k-1} + \Delta T_{4,k} - \Delta T_{3,k} \quad (13)$$

defines the first packet receiving time of the slave node $C[T_{2,k}^{K-1}]$ and the second packet transmission time of the slave node $C[T_{3,k}^{K-1}]$ by the following Equations (14) and (15), respectively, where $\delta_k$ is a k-th clock offset in the k-th clock synchronization, $f_0$ and $f_c$ represent frequencies of a clock of the master node and the clock of the slave node respectively; and $$C[T_{2,k}^{\kappa-1}] = (T_{1,k} + \delta_k) + \frac{f_{c,k}}{f_0}\phi_{s,k} \quad (14)$$

$$C[T_{3,k}^{\kappa-1}] = (T_{1,k} + \delta_k) + \frac{f_{c,k}}{f_0}\{(T_{4,k} - T_{1,k}) - \phi_{d,k}\} \quad (15)$$

derives the DLM for the PDV by the following Equation (16), where $$\Delta T_{i,k} = T_{i,k} - T_{i,k-1}, i \in \{1, 4\}, \Delta C[T_{j,k}^{\kappa-1}] = \quad (16)$$

$$C[T_{j,k}^{\kappa-1}] - C[T_{j,k-1}^{\kappa-1}], j \in \{2, 3\},$$

$$\Gamma_k = [\Delta T_{1,k} \Delta T_{4,k}]^T, \Xi_k =$$

$$[\Delta C[T_{2,k}^{\kappa-1}] \Delta C[T_{3,k}^{\kappa-1}]]^T \cdot \psi_k = \psi_{k-1} + [1\,1]\Gamma_k + \frac{f_o}{f_{c,k}}[-1\,-1]\Xi_k.$$

9. The clock synchronization apparatus according to claim 8, wherein the controller defines errors of the estimation of the packet delay of the first packet and the packet delay of the second packet by the following Equations (17) and (18);

$$\varepsilon_{\delta,k} = \frac{1}{2f_0}\{(f_{c,k} - f_0)(T_{4,k} - T_{1,k}) - f_{c,k}\psi_k\} \quad (17)$$

$$\varepsilon_{\phi,k} = \frac{1}{2f_0}\{f_{c,k}\psi_k - (f_{c,k} - f_0)(T_{4,k} - T_{1,k})\} \quad (18)$$

models the clock offset $\hat{\delta}_k^{new}$ and the packet delay $\hat{\phi}_{s,k}^{new}$ considering the errors by the following Equations (19) and (20), respectively, $n_k$ refers to relative noise with respect to the clock of the slave node; and $$\hat{\delta}_k^{new} = \hat{\delta}_k^{1588} - \varepsilon_{\delta,k} + n_k \quad (19)$$

$$\hat{\phi}_{s,k}^{new} = \frac{f_0}{f_{c,k}}(\hat{\phi}_{s,k}^{1588} - \varepsilon_{\phi,k} + n_k), \quad (20)$$

where $$\hat{\delta}_k^{1588} = (C[T_{2,k}^{\kappa-1}] - T_{1,k}) - \hat{\phi}_{s,k}^{1588} \text{ and } \hat{\phi}_{s,k}^{1588} = \frac{1}{2}\{(T_{4,k} - C[T_{3,k}^{\kappa-1}]) + (C[T_{2,k}^{\kappa-1}] - T_{1,k})\},$$

estimates the clock offset and the packet delay by inputting the time information to the modeled clock offset $\hat{\delta}_k^{new}$ and the packet delay $\hat{\phi}_{s,k}^{new}$.

10. The clock synchronization apparatus according to claim 6, further comprising an output unit to output the estimated clock offset and the packet delay to the slave node so that the slave node modifies the clock of the slave node based on the estimated clock offset and the packet delay.

* * * * *